US010956727B1

(12) United States Patent
Schaefer et al.

(10) Patent No.: US 10,956,727 B1
(45) Date of Patent: Mar. 23, 2021

(54) HANDWRITTEN DIAGRAM RECOGNITION USING DEEP LEARNING MODELS

(71) Applicant: SAP SE, Walldorf (DE)

(72) Inventors: Bernhard Schaefer, Heidelberg (DE); Andreas Gerber, Koenigsbach (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/567,928

(22) Filed: Sep. 11, 2019

(51) Int. Cl.
| G06K 9/00 | (2006.01) |
| G06K 9/46 | (2006.01) |
| G06K 9/78 | (2006.01) |
| G06K 9/20 | (2006.01) |
| G06T 11/20 | (2006.01) |
| G06T 7/70 | (2017.01) |
| G06K 9/62 | (2006.01) |

(52) U.S. Cl.
CPC ..... *G06K 9/00422* (2013.01); *G06K 9/00476* (2013.01); *G06K 9/4638* (2013.01); *G06K 9/6256* (2013.01); *G06T 7/70* (2017.01); *G06T 11/206* (2013.01); *G06K 2209/01* (2013.01); *G06T 2207/20081* (2013.01); *G06T 2207/20084* (2013.01)

(58) Field of Classification Search
CPC .......... G06K 9/00476; G06K 9/00402; G06K 9/00436; G06K 9/222; G06K 9/469; G06K 9/626; G06F 16/353; G06F 3/04883; G06F 40/205; G06F 40/171; G06F 3/0488; G06T 11/206
See application file for complete search history.

(56) References Cited

U.S. PATENT DOCUMENTS

| 2004/0090439 | A1* | 5/2004 | Dillner | G06K 9/00402 |
| | | | | 345/440 |
| 2014/0285425 | A1* | 9/2014 | Takahashi | G06F 3/04883 |
| | | | | 345/156 |
| 2017/0109578 | A1* | 4/2017 | Bednarowicz | G06F 40/205 |

OTHER PUBLICATIONS

H. Miyao, et al., "On-line handwritten flowchart recognition, beautification, and editing system", 2012 International Conference on Frontiers in Handwriting Recognition, 2012, pp. 83-88 (Year: 2012).*
W. Szwoch, "Recognition of Hand Drawn Flowcharts", Image Processing & Communications Challenges, 4, AISC 184, pp. 65-72, Springer-Verlag Berlin Heidelberg 2013, pp. 65-72 (Year: 2013).*

(Continued)

*Primary Examiner* — Jin Cheng Wang
(74) *Attorney, Agent, or Firm* — Jones Day

(57) ABSTRACT

Systems, methods, and devices are described herein for handwritten diagram recognition using machine learning. A machine learning component receives a digitally encoded image having a handwritten diagram. The machine learning component localizes and classifies a plurality of objects within the handwritten diagram. A structure recognition component identifies connections between each symbol of the plurality of objects based on content of the respective object. A handwriting recognition component interprets one or more alphanumeric text strings within a portion of the plurality of objects. A digital structured model of the digitally encoded image is automatically generated, without human intervention. The digital structured model has the identified connections among the plurality of objects and is in a computer-readable editable format.

20 Claims, 8 Drawing Sheets

(56) References Cited

OTHER PUBLICATIONS

A. K. Mishra, et al., "VizDraw: A Platform to Convert Online Hand-Drawn Graphics into Computer Graphics", ICIAR 2009, LNCS 5627, 2009, pp. 377-386 (Year: 2009).*
Z. Yuan, H. Pan, and L. Zhang, "A Novel Pen-Based Flowchart Recognition System for Programming Teaching," in WBL, ser. Lecture Notes in Computer Science, E. W. C. Leung, F. L. Wang, L. Miao, J. Zhao and J. He, Eds., vol. 5328. pp. 55-64, Springer, 2008 (Year: 2008).*
A. M. Awal, G. Feng, H. Mouchere, and C. V. Gaudin, "First Experiments on a new Online Handwritten Flowchart Database," Proc. of SPIE—The International Society for Optical Engineering, Jan. 2011, pp. 1-10 (Year: 2011).*
A. Lemaitre, H. Mouchere, J. Camillerapp, and B. Couasnon, "Interest of syntactic knowledge for on-line flowchart recognition," in Proc. of ninth IAPR International Workshop on Graphics Recognition (GREG2011), pp. 85-88, 2011 (Year: 2011).*
Awal et al., "First experiments on a new online handwritten flowchart database," *Proc. SPIE 7874, Document Recognition and Retrieval XVIII*, 78740A (2011).
Bresler et al., "Modeling flowchart structure recognition as a max-sum problem," *2013 12th International Conference on Document Analysis and Recognition*, pp. 1215-1219 (2013).
Bresler et al., "Online recognition of sketched arrow-connected diagrams," *International Journal of Document Analysis and Recognition*, 19(3):253-267 (2016).
Bresler et al., "Recognizing off-line flowcharts by reconstructing strokes and using on-line recognition techniques," *2016 15th International Conference on Frontiers in Handwriting Recognition (ICFHR)*, pp. 48-53 (2016).
Carton et al., "Fusion of statistical and structural information for flowchart recognition," *2013 12th International Conference on Document Analysis and Recognition*, pp. 1210-1214 (2013).
Girshick et al., "Rich feature hierarchies for accurate object detection and semantic segmentation," *2014 IEEE Conference on Computer Vision and Pattern Recognition (CVPR)*, 1:580-587 (2014).
He et al., "Mask R-CNN," *IEEE International Conference on Computer Vision*, pp. 2961-2969 (2017).
Julca-Aguilar et al., "Symbol detection in online handwritten graphics using faster R-CNN," *2018 13th IAPR International Workshop on Document Analysis Systems (DAS)*, 1:151-156 (2018).
Lemaitre et al., "Interest of syntactic knowledge for on-line flowchart recognition," in *Graphics Recognition. New Trends and Challenges* 9$^{th}$ International Workshop, pp. 89-98 (2011).
Lin et al., "Feature pyramid networks for object detection," *Proceedings of the IEEE Conference on Computer Vision and Pattern Recognition*, pp. 2117-2125 (2017).
Marti et al., "The IAM-database: An English sentence database for offline handwriting recognition," *International Journal on Document Analysis and Recognition*, 5(1):39-46 (2002).
Massa et al., "Maskrcnn-benchmark: Fast, modular ref-erence implementation of instance segmentation and object detection algorithms in PyTorch," Retrieved on Aug. 22, 2019. Retrieved online from URL:https://github.com/facebookresearch/maskrcnn-benchmark, 6 pages (2018).
Mouch'ere, "Online handwritten flowchart dataset (OHFCD)," Jun. 20, 2018, Retrieved on Aug. 22, 2019. Retrieved online from URL:http://tc11.cvc.uab.es/datasets/OHFCD 1, 2 pages.
Pacha et al., "Handwritten music object detection: open issues and baseline results," *2018 13th IAPR International Workshop on Document Analysis Systems (DAS)*, 1:163-168 (2018).
Ren et al., "Faster R-CNN: Towards real-time object detection with region proposal networks," *Advances in Neural Information Processing Systems 28*, pp. 91-99 (2015).
Toshev et al., "DeepPose: human pose estimation via deep neural networks," *2014 IEEE Conference on Computer Vision and Pattern Recognition (CVPR)*, 1:1653-1660 (2014).
Van Der Walt et al, "scikit-image: Image processing in Python," *PeerJ*, 2:e453 (2014).
Wang et al., "Combined Segmentation and Recognition of Online Handwritten Diagrams with High Order Markov Random Field," *2016 15th International Conference on Frontiers in Handwriting Recognition (ICFHR)*, 1:252-257 (2016).
Wang et al., "Online flowchart understanding by combining max-margin Markov random field with grammatical analysis," *International Journal on Document Analysis and Recognition (IJDAR)*, 20(2):123-136(2017).
Wu et al., "Offline sketch parsing via shapeness estimation," *Proceedings of the Twenty-Fourth International Joint Conference on Artificial Intelligence (IJCAI)*, pp. 1200-1206 (2015).

* cited by examiner

HANDWRITTEN DIAGRAM RECOGNITION USING DEEP LEARNING MODELS

TECHNICAL FIELD

The subject matter described herein relates to enhanced techniques for handwritten diagram recognition using deep learning models.

BACKGROUND

Graphical modeling languages such as flowcharts, Unified Modeling Language (UML), or Business Process Model and Notation (BPMN) are frequently used to describe concepts such as business processes, algorithms, or software architectures. These diagrams include named symbols that represent concepts and lines and/or arrows that connect the symbols and represent relationships among such concepts. Even though there are numerous software providers for creating diagrams of all kinds on a digital computer, it is still widespread practice to create initial sketches on a whiteboard or pen and paper. For example, in the area of Business Process Management (BPM), simple process diagrams can be sketched on whiteboards or paper during process discovery workshops. Transferring such a handwritten sketch into an interchangeable model format can be a tedious manual process. This means that currently, people within organizations either archive a photo of the sketch or invest a substantial amount of time to recreate the model using diagram modeling software.

SUMMARY

In one aspect, a machine learning component receives a digitally encoded image including a handwritten diagram. The machine learning component localizes and classifies a plurality of objects within the handwritten diagram. A structure recognition component identifies connections between each symbol of the plurality of objects based on content of the respective object. A handwriting recognition component interprets one or more alphanumeric text strings within a portion of the plurality of objects. A digital structured model of the digitally encoded image is automatically generated, without human intervention. The digital structured model has the identified connections among the plurality of objects and is in a computer-readable editable format.

In some variations, the localizing and the classifying can include (i) defining a plurality of bounding boxes surrounding the plurality of objects and (ii) classifying each bounding box as at least one of a terminator block, a process block, an arrow block, a text block, or a decision block. Each bounding box surrounding one object.

In other variations, the portion of the plurality of objects can include each bounding box classified as the text block.

In some variations, each identified text phrase can be mapped to a corresponding bounding box based on a spatial location within the digitally encoded image.

In other variations, for each bounding box classified as the arrow block, an arrow head and an arrow tail can be identified.

In some variations, the connections can be identified based on a minimum distance between sides of each bounding box relative to an arrow head or an arrow tail.

In other variations, the machine learning component can use a convolutional neural network (CNN) architecture.

In some variations, the machine learning component can be trained using at least one of (i) a plurality of images having random rotational transformations of 0°, 90°, 180°, or 270° or (ii) a plurality of flowcharts having extraneous words scattered throughout each flowchart.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an automation tool that can automatically convert an image of a sketched diagram, such as a handwritten business process sketch on a whiteboard, into a digital structured graphical model. The deep learning model can be integrated into a larger system for end-to-end handwritten diagram recognition The deep learning system described herein can also be trained to detect any kind of graphical modeling languages that include symbols, textual annotations, and/or arrow interconnections. Use of such subject matter can allow for substantial time savings and foster collaborative and creative environments commonly performed on a whiteboard.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
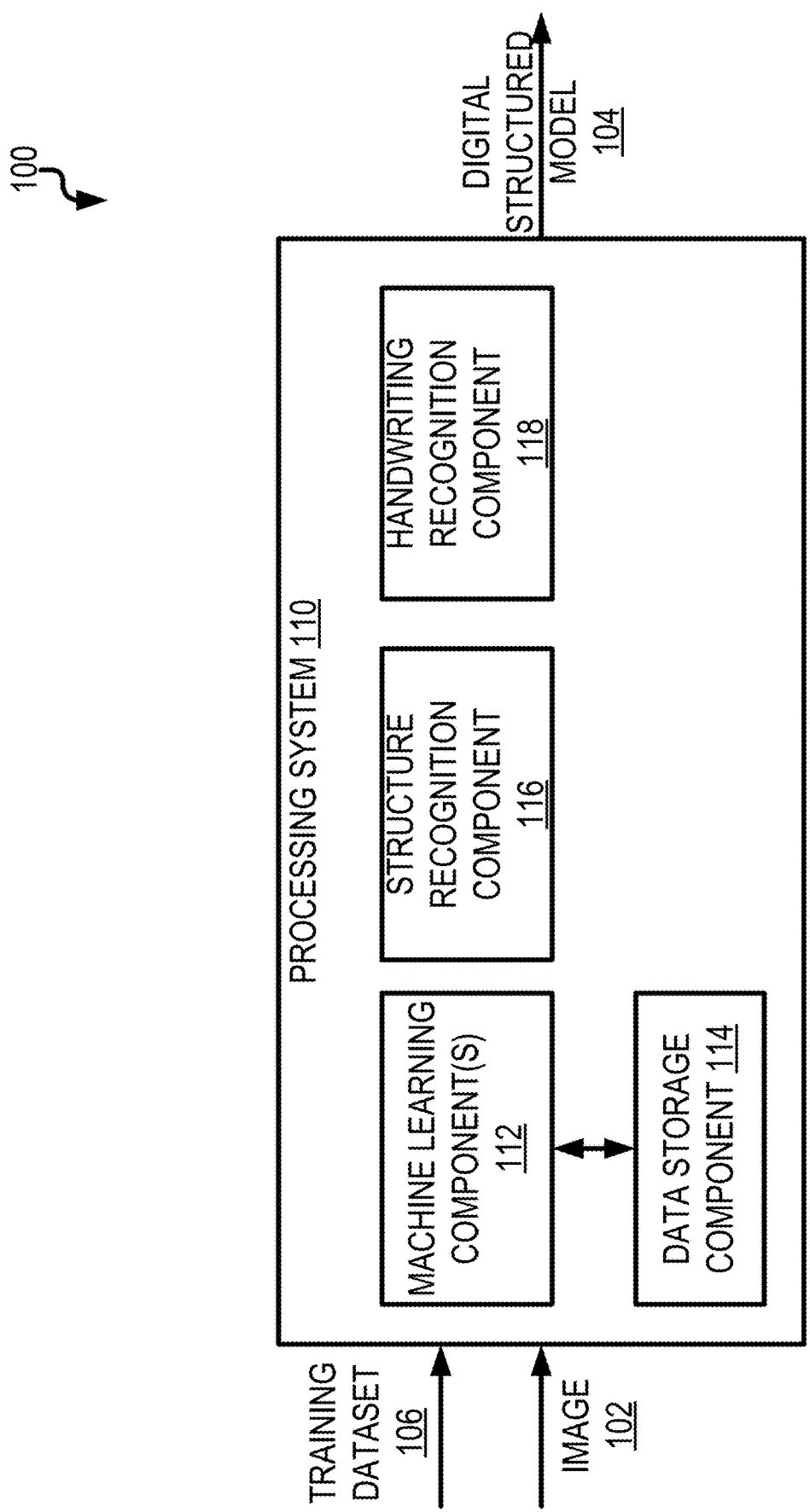
FIG. 1 illustrates an example system that processes an input image and generates a digital structured model of that input image.

Flowchart recognition can be divided into two basic approaches: online recognition and offline recognition. With online recognition, flowchart diagrams are drawn on an input device such as a tablet. This input device captures the drawing as a sequence of strokes. With offline recognition, the input is a raster image and is processed after the image is created. Offline recognition can be used, for example, in recognizing flowcharts drawn on whiteboards. For recognizing objects within images, object detectors based on convolutional neural networks (CNNs) can be used. While CNNs can be applied to detect individual symbols of a flowchart, an off-the-shelf object detector cannot be used to detect the relationships between elements within an image. As described herein a deep learning system in combination with structure and handwriting recognition can be used for offline diagram recognition for flowcharts. The system receives an image of a diagram as input (e.g., an image of a handwritten business process diagram drawn on a whiteboard). The system recognizes the symbols and arrow keypoint structures within the handwritten diagram of the received image and generates a digital structured diagram as output.

FIG. 1 illustrates an example system 100 that processes an input digitally encoded image 102 and generates a digital structured model 104 of that input digitally encoded image 102. Input digitally encoded image 102 can include any computer-readable raster image extension format such as joint photographic experts group (.jpeg or .jpg), portable network graphics (.png), graphics interchange format (.gif), tagged image file (tiff), and/or a bitmap (.bmp). The system 100 includes one or more processing systems 110. Processing system 110 includes machine learning component(s) 112. Machine learning component(s) 112 receives training dataset 106 (e.g., various flowcharts with symbol, textual, and arrow annotations). The training dataset 106 and digitally encoded image 102 may be received by the processing system 110 via a communications network, e.g., an Internet, an intranet, an extranet, a local area network ("LAN"), a wide area network ("WAN"), a metropolitan area network ("MAN"), a virtual local area network ("VLAN"), and/or any other network. The training dataset 106 and digitally encoded image 102 may also be received via a wireless, a wired, and/or any other type of connection. Once trained, machine learning component(s) 112 can detect symbols, text phrases, and/or arrow keypoints within digitally encoded image 102. Machine learning component(s) 112 can include a neural network system described in more detail in FIG. 3. Processing system also includes structure recognition component 116 and a handwriting recognition component 118. Structure recognition component 116 can determine connections between symbols within digitally encoded image 102, as described in more detail in FIG. 4. Handwriting recognition component 118 to convert detected handwritten text phrases within digitally encoded image 102, as described in more detail in FIGS. 4-5. Additionally, processing system 110 performs text-to-symbol mapping, as described in more detail in FIG. 4.

Processing system 110 may be implemented using software, hardware and/or any combination of both. Processing system 110 may also be implemented in a personal computer, a laptop, a server, a mobile telephone, a smartphone, a tablet, and/or any other type of device and/or any combination of devices. The machine learning component(s) 112 may perform execution, compilation, and/or any other functions on the received training dataset 106 as well as machine learning functions, as discussed in further detail below. Processing system 110 can also include a data storage component 114. The data storage component 114 may be used for storage of data processed by processing system 110 and may include any type of memory (e.g., a temporary memory, a permanent memory, and/or the like). Although FIG. 1 illustrates machine learning component 112, data storage component 114, structure recognition component 116, and handwriting recognition component 118 all within a single processing system 110, it is recognized that one or more of these components can be spread across additional processing systems.

Figure 2:
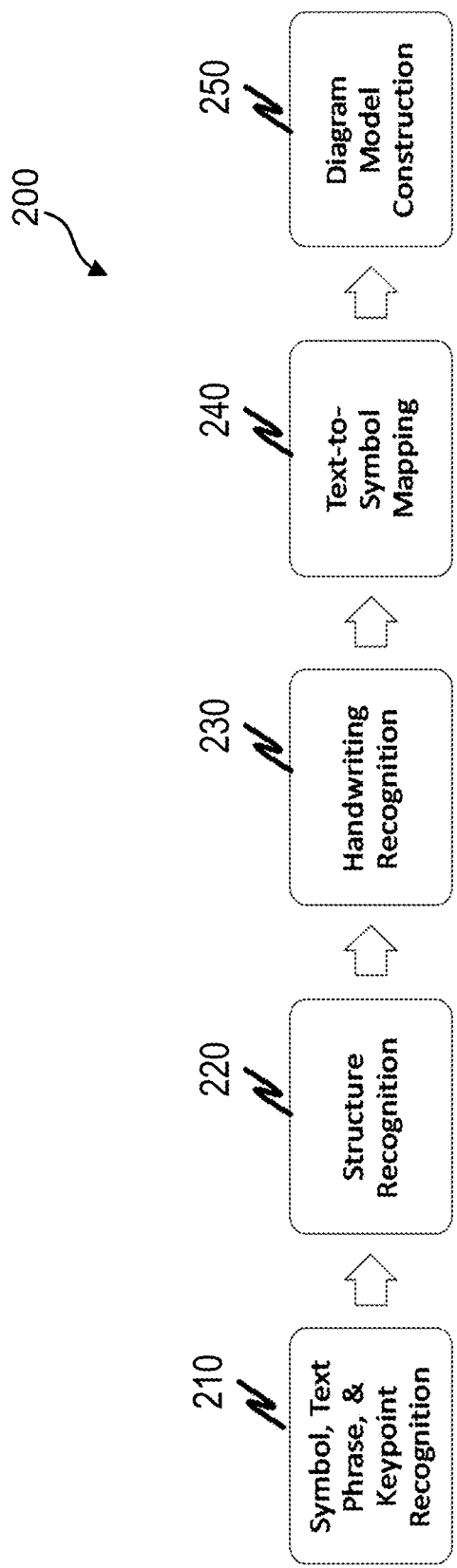
FIG. 2 depicts an end-to-end diagram model recognition process that is performed on an input image.

FIG. 2 depicts an end-to-end diagram model recognition process 200 that is performed on an input digitally encoded image 102. Symbol, text phrase, and arrow keypoints recognition 210 can be performed on the image to identify symbols, text phrases, and/or arrows within input image 102. Structure recognition 220 can use recognized symbols, text phrases, and arrow keypoints from 210 to determine arrow connections between the identified symbols within input digitally encoded image 102. Handwriting recognition 230 uses the detected blocks of text within input digitally encoded image 102 and further recognizes the text within those blocks. Text-to-symbol mapping 240 can assign any identified blocks of texts to a corresponding symbol (e.g., wording within a decision block of the flowchart). With all the information gathered through symbol, text phrase, and keypoint detection 210, structure recognition 220, handwriting recognition 230, and text-to-symbol mapping 240, a digital structured model 104 can be constructed through diagram model construction 250.

Figure 3:
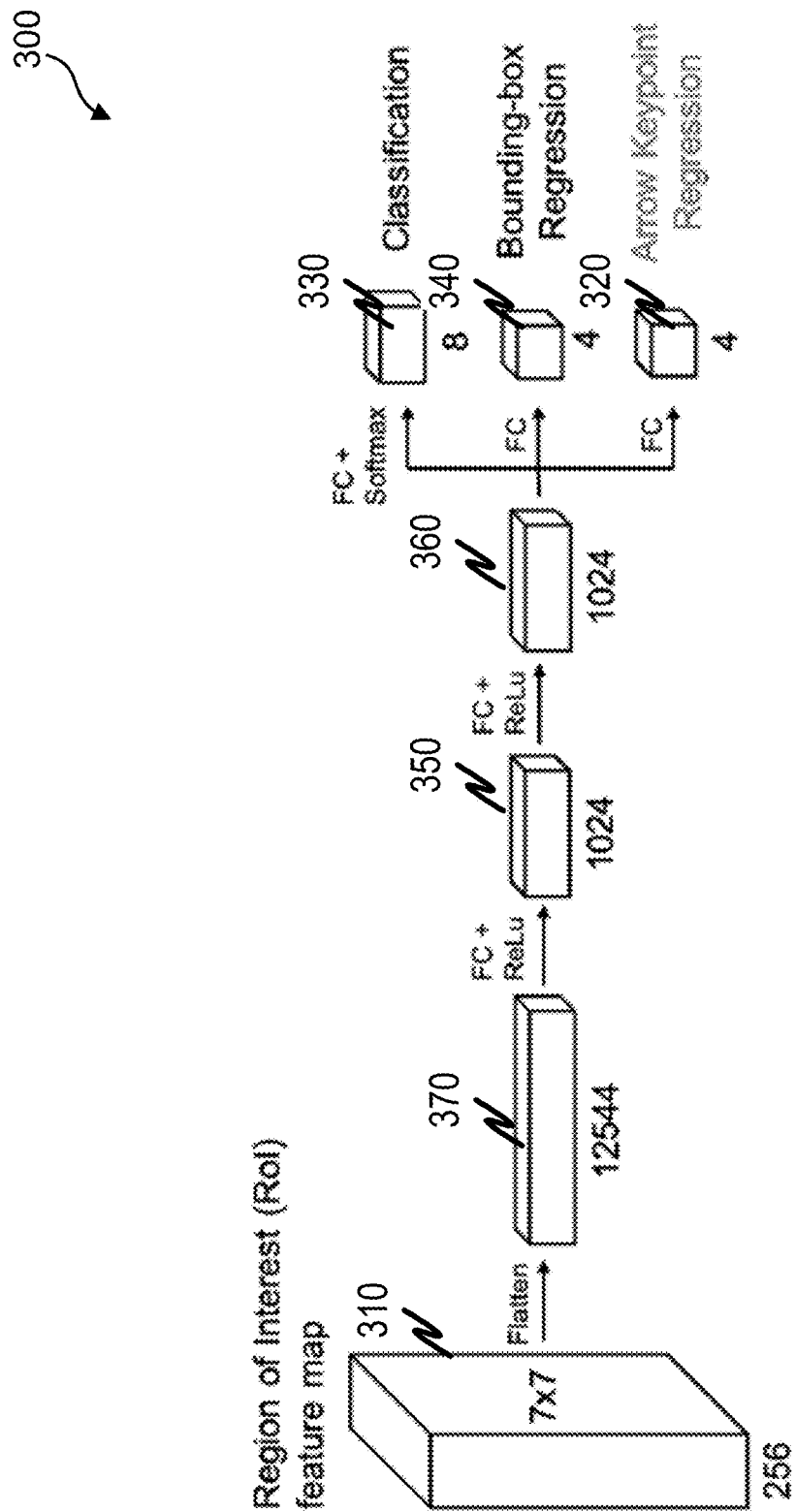
FIG. 3 depicts an example head network for use in symbol and keypoint recognition.

FIG. 3 depicts an example head network 300 for use in symbol, text phrase, and keypoint recognition 210. Symbol, text phrase, and keypoint recognition 210 can use a region-based convolutional neural network (R-CNN) as its deep learning object detection system. In other words, machine learning component(s) 112 can include R-CNN capabilities. The R-CNN method can be extended with a component for recognizing arrow keypoints which is known as arrow R-CNN. Arrow R-CNN predicts a set of detected objects for an input digitally encoded image 102 and can include a two-stage approach to processing. The first stage (e.g., Stage 1) generates a set of region of interests (RoI), where each RoI is defined by a bounding box location and an objectness score. The second stage (e.g., Stage II) then classifies each RoI and predicts a refined bounding box location. Arrow R-CNN can also include sub-networks for both Stage I and Stage II. Such sub-networks include a CNN backbone network, a region proposal network (RPN), and a head network for object detection. The CNN backbone network is used to extract a featurized representation of the entire input digitally encoded image 102. This feature map has a lower spatial resolution W×H, but a much higher number of channels, C, than the original input digitally encoded image 102. For example, a 1000×800 red, green, and blue (RGB) image might be compressed to a 20×16×512 feature map, where each entry represents a high-level feature detected within the corresponding part of the image. The RPN uses the feature map to propose a set of RoIs. The head network 300 classifies each RoI as one of the object classes or as background (e.g., classification 330) and refines its bounding box location. It uses RoI pooling, a pooling mechanism to extract a fixed-sized feature map for each proposal (e.g., 7×7×512, 14×14×512, or 7×7×1024). RoI pooling uses the proposal bounding box to extract the relevant spatial part of the backbone feature map and then applies pooling to reduce it to a fixed-size representation. The head network 300 uses intermediate fully connected layers before it classifies each RoI and predicts its refined bounding box using a softmax classification and a linear regression head (e.g., bounding box regression 340).

Arrow R-CNN head network 300 processes each RoI feature within RoI feature map 310 through fully connected (FC) layers with rectified linear unit activation functions (ReLu) 350, 360. Arrow R-CNN head network 300 then predicts a class refined bounding box, and arrow keypoints from a 1024-dimensional feature vector (e.g., arrow keypoint regression 320, classification 330, and bounding-box regression 340). Arrow R-CNN can also integrate the concept of Feature Pyramid Networks (FPNs). In this case, the backbone network generates a pyramid of feature maps at different scales. During RoI pooling, an RoI is assigned to a feature pyramid level based on its bounding box dimension. This has the advantage that if the RoI's scale becomes smaller, it can be mapped into a finer resolution level.

Each detected object within digitally encoded image 102 is specified through a predicted class (e.g., decision node) and an object bounding box. Head network 300 is part of the arrow R-CNN. Head network 300 can take a 7×7×256 RoI feature map 310 as input. In this example, head network 300 has a spatial resolution of 7×7 and 256 channels. It is recognizes that such spatial resolution and number of channels can differ in other examples. The RoI feature map 310 is flattened to generate a flattened vector 370. Head network 300 include an arrow keypoint regressor 320 that predicts the arrow head and tail keypoints as a 4-dimensional vector. The arrow keypoint targets relative to the proposal bounding box. For example, if a proposal bounding box is expressed by the following equation:

$$b = (c, w, h) \qquad (1)$$

where c is a center point of the bounding box represented by the equation:

$$c = (c_x, c_y) \qquad (2)$$

where $c_x$ is a point on an x-axis and $c_y$ is a point on the y-axis, w is a width of the bounding box, and h is the height of the bounding box. The width, w, and height, h, of the bounding box can be defined such that the size of the bounding box, b, is represented by the following equation:

$$b = 4wh. \qquad (3)$$

For a ground-truth arrow keypoint, k, defined by the expression:

$$k = (k_x, k_y) \qquad (4)$$

where $k_x$ is a point on an x-axis and $k_y$ is a point on the y-axis, assigned to a proposal with bounding box, b, a keypoint regression target, t, can be defined as:

$$t = (t_x, t_y) = \left( \frac{k_x - c_x}{w}, \frac{k_y - c_y}{h} \right). \qquad (5)$$

This means that $t_x$ and $t_y$ are within the range [−1, 1], unless the proposal bounding box does not fully contain the ground truth arrow bounding box.

During training, the arrow R-CNN uses a smooth loss, $L_1$, expressed by the following:

$$\mathrm{smooth}_{L_1}(y, \hat{y}) = \begin{cases} 0.5(y - \hat{y})^2 & \text{if } |y - \hat{y}| < 1 \\ |y - \hat{y}| - 0.5 & \text{otherwise} \end{cases} \qquad (6)$$

for bounding box regression to prevent exploding gradients. A flowchart with n arrows has 2n keypoints, one head and tail keypoint per arrow. Given the set of target keypoints over all arrows in the image which can be expressed by:

$$T = \{t^{(1)}, \ldots, t^{2n}\} \qquad (7)$$

and corresponding predictions can be expressed by:

$$\tilde{T} = \{\tilde{t}^{(1)}, \ldots, \tilde{t}^{2n}\}. \qquad (8)$$

The flowchart arrow loss is the summation of the loss over all keypoints and can be expressed by the following equation:

$$L_{arw}(\tilde{T}, T) = \sum_{i=1}^{2n} \mathrm{smooth}_{L_1}(\tilde{t}_x^{(i)}, t_x^{(i)}) + \mathrm{smooth}_{L_1}(\tilde{t}_y^{(i)}, t_y^{(i)}). \qquad (9)$$

The arrow R-CNN head network multi-task loss, $L_{head}$, can be expressed by the following:

$$L_{head} = L_{cls} + L_{lcoc} + \lambda L_{arw} \qquad (10)$$

where $L_{cls}$ is the classification loss, $L_{loc}$ is the localization loss for bounding box refinement regression, and $\lambda$ is a hyperparameter that controls the loss reduction over multiple arrows and the balance between arrow and other task losses. In some variations, the following hyperparameter expression provides sufficient balance:

$$\lambda = \frac{1}{2n}. \qquad (11)$$

There are other possible architectures for arrow keypoint prediction such as a dedicated arrow keypoint branch next to the existing head that also takes as input the RoI feature map and regresses the keypoints after several layers. Another example includes use of a joint head for the three tasks which imposes a strong regularization effect.

During inference arrow R-CNN generates a set of detections per image, where each detection has a score corresponding to the highest softmax score. To reduce the false-positive ratio, all detections with a score smaller than a threshold (e.g., threshold of approximately 0.7) can be eliminated. For each predicted arrow, the symbols it connects to can be specified as the symbols closest to each arrow keypoint. The closeness between a keypoint and a symbol can be defined as the distance between the keypoint and the symbol bounding box. Since the bounding boxes are axis-aligned this distance can be computed as the minimum distance to each side of the rectangle.

Figure 4:
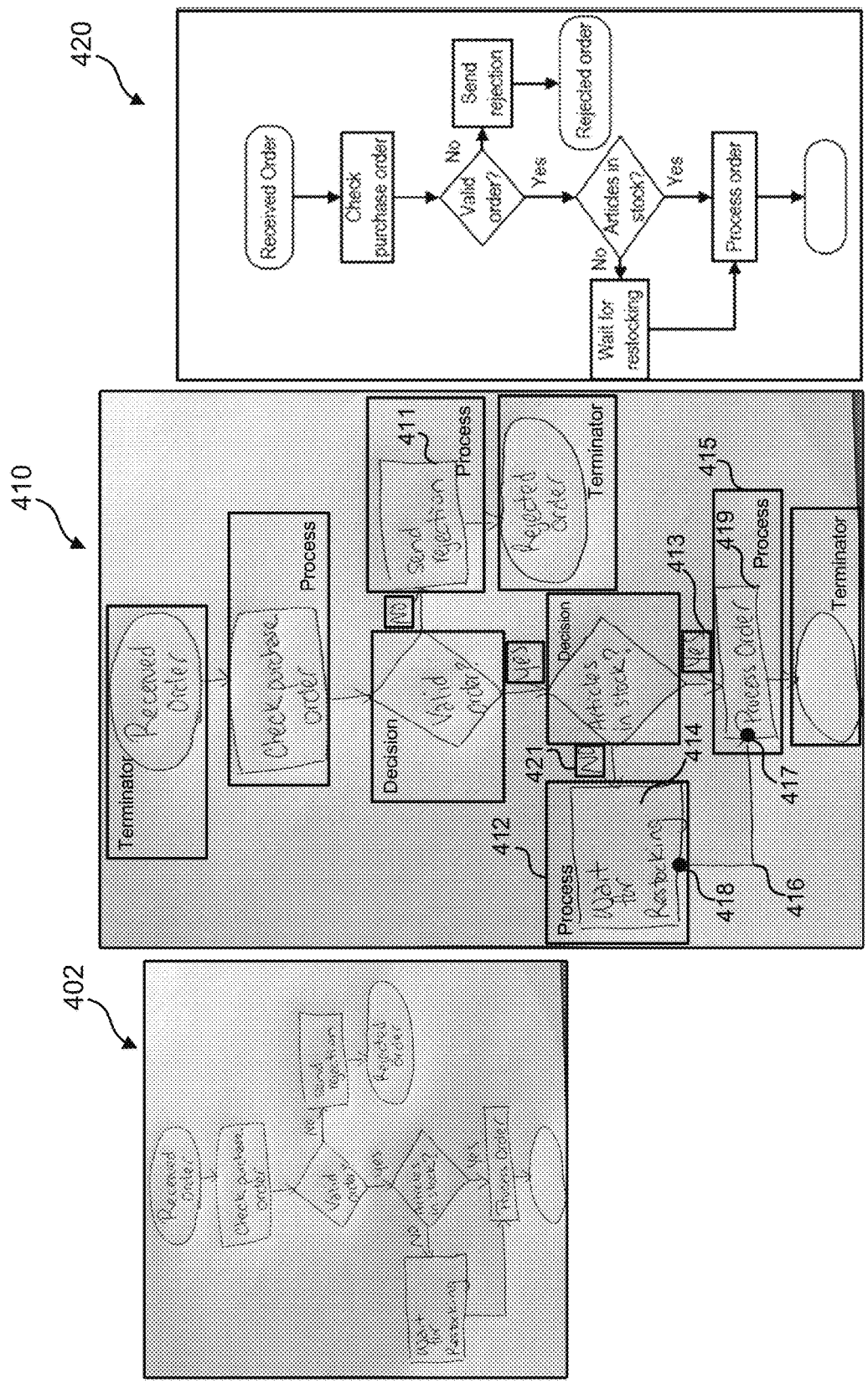
FIG. 4 depicts an example image of a flowchart captured from a whiteboard, including intermediate and final recognition results.

FIG. 4 depicts an example image 402 of flowchart captured from a whiteboard, including intermediate and final recognition results. Image 402 is received as input by machine learning component(s) 112. Machine learning component(s) 112 performs symbol, text phrase, and keypoint recognition 210 and outputs an annotated image 410 having a set of detected objects, where each object is described through a type (e.g., terminator block, process block, arrow block, text block, and/or decision block) and a bounding box. In addition, for arrows the machine learning component(s) 112 predicts keypoint information that specifies the spatial locations of the arrow head and arrow tail. Each symbol is localized through a bounding box (e.g., 412, 414, 416) and classified into a symbol class (e.g., terminator block, process block, arrow block, text block, and/or decision block). Additionally, for bounding boxes that are classified as arrows (e.g., arrow 416), machine learning component(s) 112 also predicts an arrow head 417 and an arrow tail 418. Once objects and bounding boxes are identified within input image 402, input image 402 can be cropped along each side up to the beginning of the outermost bounding box.

For recognizing structure within the image 402, structure recognition 220 can determine connections between the symbols (e.g., between bounded box 412 and bounded box 415). For example, the symbols which connect to predicted arrow 416 are identified with structure recognition 200. The symbols connected to predicted arrow 416 are those symbols closest to each arrow keypoint (e.g., arrow head 417 and arrow tail 418). The closeness between a keypoint and a symbol can be the distance between the keypoint and the symbol bounding box. The bounding boxes are axis-aligned. As such, the distance measured for closeness can be the minimum distance to each side of the bounding box. Continuing with arrow 416 as an example, the two bounding boxes closest to the arrow keypoints include bounding box 412 and bounding box 415. As such, both bounding box 412 and bounding box 415 can be identified as connected to arrow 416 during structure recognition 220.

Figure 5:
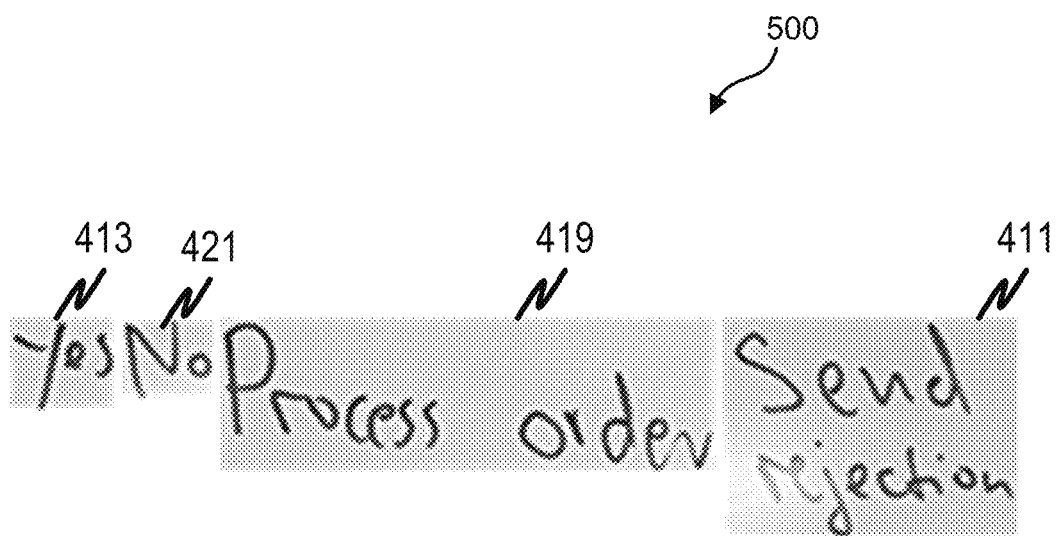
FIG. 5 depicts example detected text phrases cropped out of an example image.

Handwriting recognition 230 can be performed on image 402 to recognize the phrases within identified text blocks from output from symbol, text phrase, and arrow keypoints recognition 210. As previously described the text blocks within image 402 can be identified using machine learning component(s) 112 via symbol, text phrase, and arrow keypoints recognition 210 (e.g., text 411, 413, 419, 421). The detected text blocks 500 can be cropped out of image 402 as illustrated in FIG. 5. Any appropriate handwriting recognition system can be used to determine the phrases within each detected text block.

Before constructing digital structured model 420, text phrases can be assigned to its corresponding symbol using text-to-symbol mapping 250. For each text phrase identified, a check is performed to see if its bounding box is contained within a symbol bounding box to at least approximately 80%. For example, within annotated image 410, each symbol is localized through a bounding box and classified into one of the symbol classes. Bounding box 414 (e.g., "Wait for restocking") is fully contained (e.g., 100%) within process bounding box 412. As a result, the text annotation "Wait for restocking" is assigned to process bounding box 414.

For generating the digital structured model 420, the symbols are recreated based on corresponding bounding box spatial positions, symbol class, and optional textual annotation. The detected arrows are then created with the identified connecting symbols. Text phrases that have not been matched to symbols, which are commonly used to annotate arrows, are placed at its original position. The generation of digital structured model 420 can be fully automated such that no manual intervention is required.

Augmentation can be used to train machine learning component(s) 112. For example, during a training session, training data set 106 can include image transformations. Random image transformations can be made to images within training dataset 106 such as random degree rotation (e.g., 0°, 90°, 180°, 270°), flipping of images (e.g., horizontal and/or vertical rotation), and/or random resizing of images (e.g., resizing images to scales of [640,800] pixels, having a step size of 32. In another example training session, training dataset 106 can include word augmentation. Such training can avoid false detection occurrences of a symbol within a text phrase (e.g., a handwritten "1" in the word "false" being detected as an arrow symbol).

Figure 6:
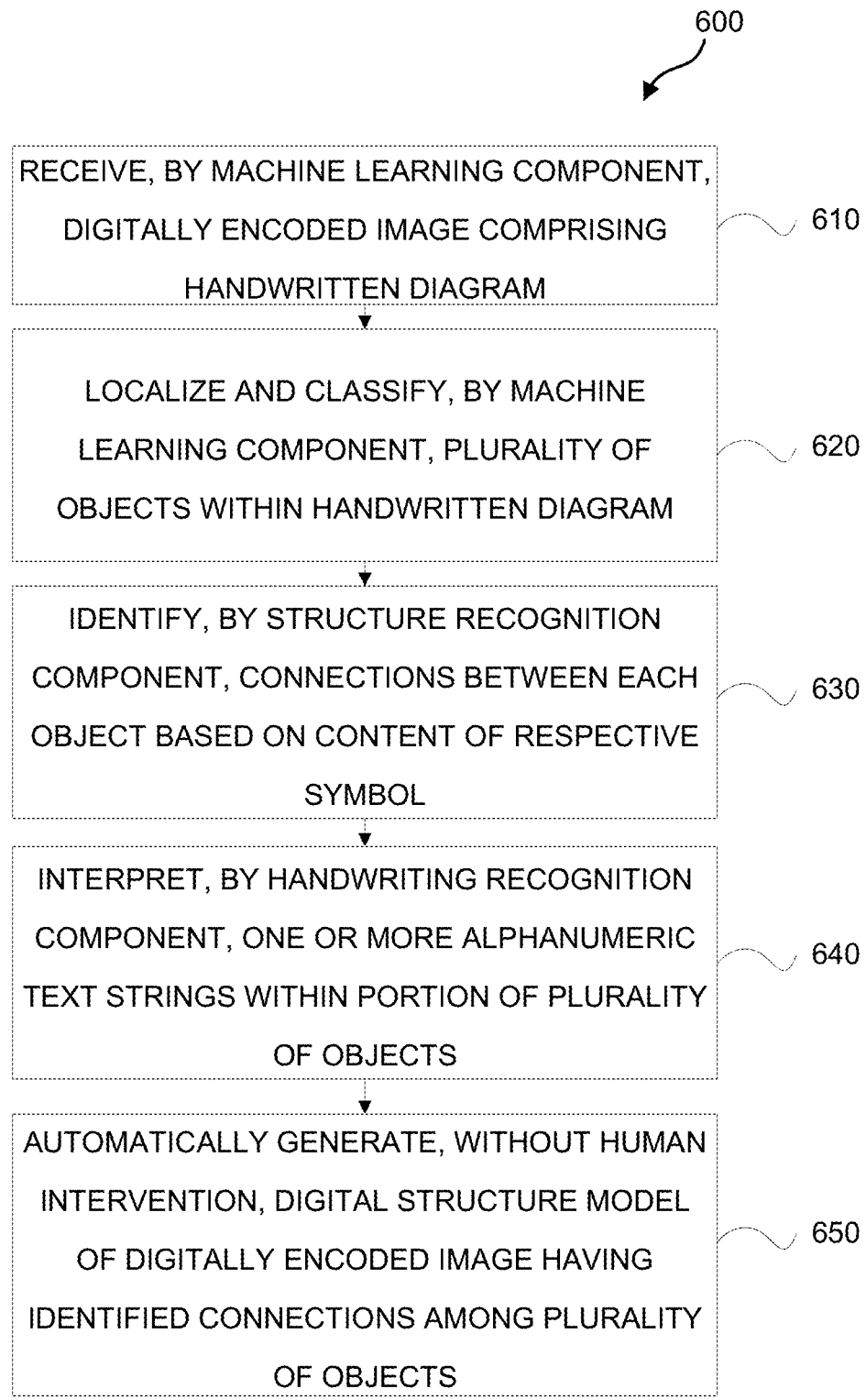
FIG. 6 depicts an example flowchart for generating a digital structured model based on an input image.

FIG. 6 depicts an example flowchart 600 for generating a digital structured model based on an input digitally encoded image 102. A machine learning component receives, at 610, a digitally encoded image comprising a handwritten diagram. A plurality of objects are localized and classified, at 620, by the machine learning component within the handwritten diagram. A structure recognition component identifies, at 630, connections between each object of the plurality of objects based on content of the respective object. One or more alphanumeric text strings within the handwritten diagram are interpreted, at 640, by a handwriting recognition component. A digital structured model of the digitally encoded image is automatically generated, at 650, without human intervention. The digital structured model has the identified connections among the plurality of objects, the digital structured model being in a computer-readable editable format.

Figure 7:
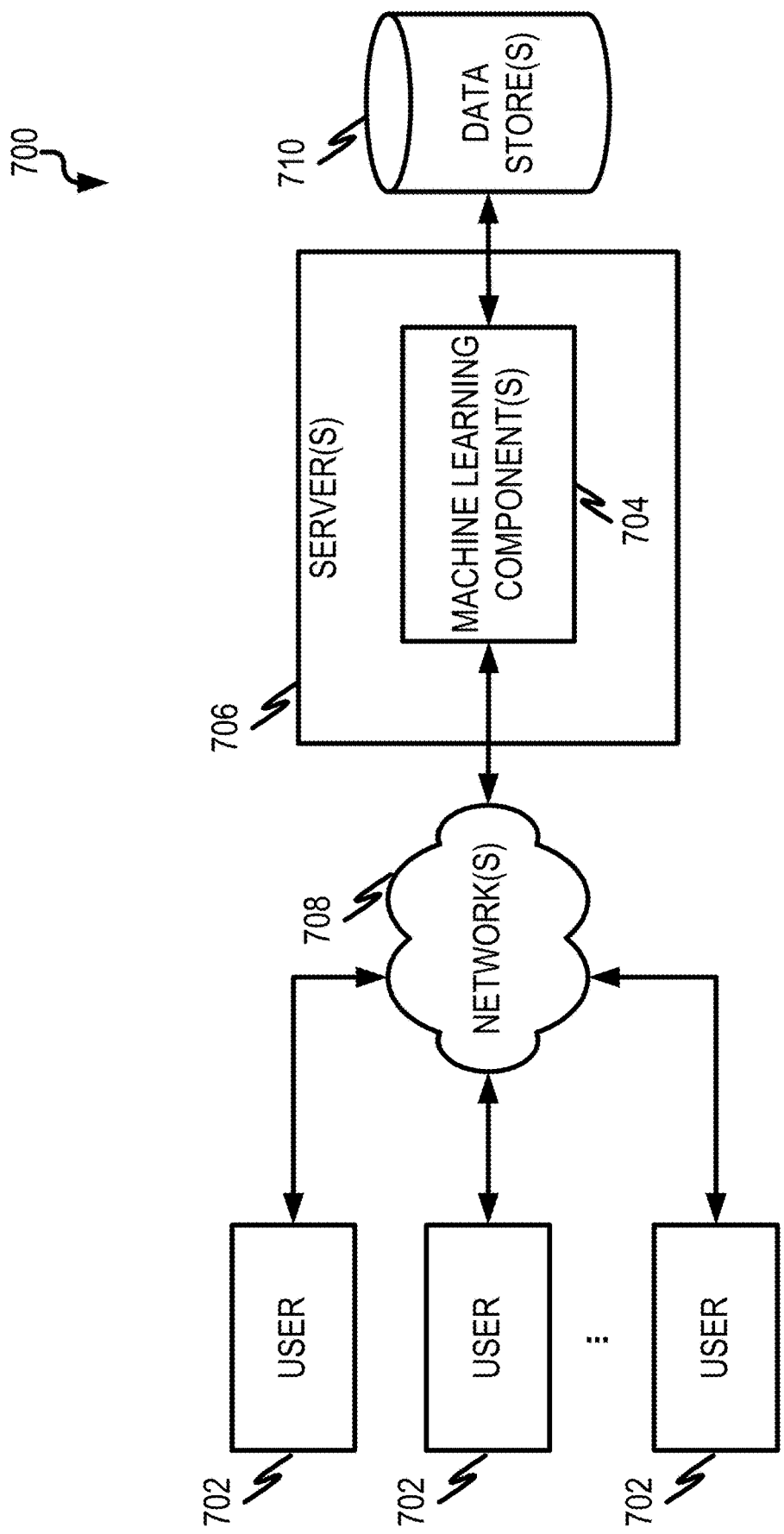
FIG. 7 illustrates an example computer-implemented environment for implementing various aspects described herein.

FIG. 7 illustrates an example computer-implemented environment 700 wherein users 702 can interact with machine learning component(s) 704 for processing handwritten images as described herein, hosted on one or more servers 706 through a network 708. The simulation module 704 can assist the users 702 with interfacing between an object-oriented modeling language based interface and a hardware description language based interface.

As shown in FIG. 7, the users 702 can interact with the machine learning component(s) 704 through a number of ways, such as over one or more networks 708. One or more servers 706 accessible through the network(s) 708 can host the machine learning component(s) 704. The one or more servers 706 can also contain or have access to one or more data stores 710 for storing data for the machine learning component(s) 704.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 8:
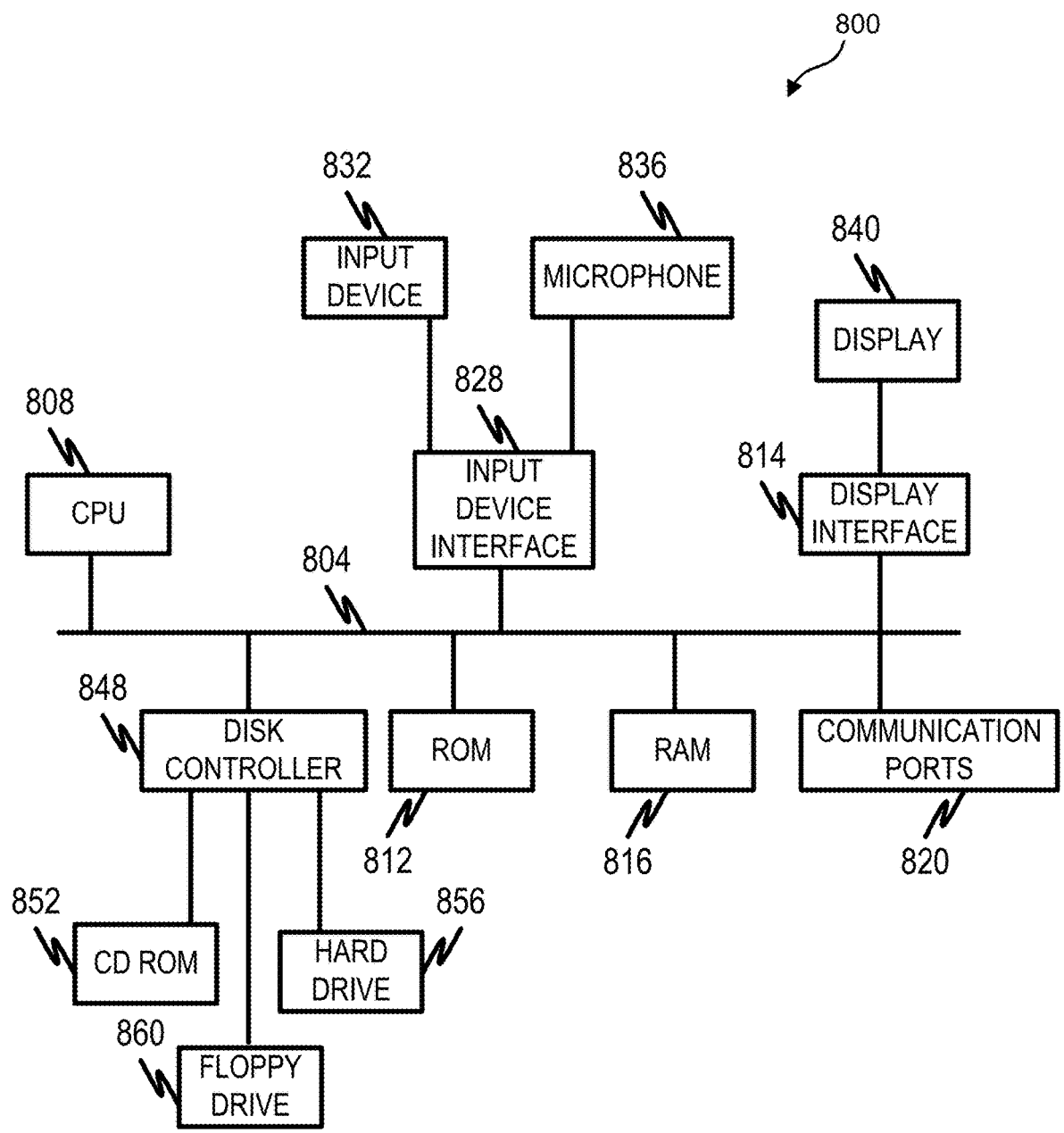
FIG. 8 is a diagram illustrating a sample computing device architecture for implementing various aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. In the input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more data processors forming part of at least one computing device, the method comprising:
receiving, by a machine learning component, a digitally encoded image comprising a handwritten diagram;
localizing and classifying, by the machine learning component, a plurality of objects within the handwritten diagram by defining a plurality of bounding boxes surrounding the plurality of objects based on a feature map extracted from the digitally encoded image, each bounding box surrounding one object, wherein the feature map is a compressed version of the digitally encoded image having pixels of the digitally encoded image mapped to pixels in the compressed version;
identifying, by a structure recognition component, connections between each symbol of the plurality of objects based on content of the respective object;
interpreting, by a handwriting recognition component, one or more alphanumeric text strings within a portion of the plurality of objects; and automatically generating, without human intervention, a digital structured model of the digitally encoded image, the digital structured model having the identified connections among the plurality of objects, the digital structured model being in a computer-readable editable format.

2. The method of claim 1, wherein the localizing and the classifying comprise:
classifying each bounding box as at least one of a terminator block, a process block, an arrow block, a text block, or a decision block.

3. The method of claim 2, wherein the portion of the plurality of objects comprises each bounding box classified as the text block.

4. The method of claim 2, further comprising identifying, for each bounding box classified as the arrow block, an arrow head and an arrow tail.

5. The method of claim 1, further comprising mapping each identified text phrase to a corresponding bounding box based on a spatial location within the digitally encoded image.

6. The method of claim 1, wherein the connections are identified based on a minimum distance between sides of each bounding box relative to an arrow head or an arrow tail.

7. The method of claim 1, wherein the machine learning component uses a convolutional neural network (CNN) architecture.

8. The method of claim 1, wherein the machine learning component is trained using at least one of (i) a plurality of images having random rotational transformations of 0°, 90°, 180°, or 270° or (ii) a plurality of flowcharts having extraneous words scattered throughout each flowchart.

9. A system comprising:
one or more data processors; and
memory storing instructions stored on one or more data processors, which when executed perform operations comprising:
receiving, by a machine learning component, a digitally encoded image comprising a handwritten diagram;
localizing and classifying, by the machine learning component, a plurality of objects within the handwritten diagram by defining a plurality of bounding boxes surrounding the plurality of objects based on a feature map extracted from the digitally encoded image, each bounding box surrounding one object, wherein the feature map is a compressed version of the digitally encoded image having pixels of the digitally encoded image mapped to pixels in the compressed version;
identifying, by a structure recognition component, connections between each symbol of the plurality of objects based on content of the respective object;
interpreting, by a handwriting recognition component, one or more alphanumeric text strings within a portion of the plurality of objects; and
automatically generating, without human intervention, a digital structured model of the digitally encoded image, the digital structured model having the identified connections among the plurality of objects, the digital structured model being in a computer-readable editable format.

10. The system of claim 9, wherein the localizing and the classifying comprise:
classifying each bounding box as at least one of a terminator block, a process block, an arrow block, a text block, or a decision block.

11. The system of claim 10, wherein the portion of the plurality of objects comprises each bounding box classified as the text block.

12. The system of claim 10, further comprising identifying, for each bounding box classified as the arrow block, an arrow head and an arrow tail.

13. The system of claim 10, wherein the machine learning component uses a convolutional neural network (CNN) architecture.

14. The system of claim 10, wherein the machine learning component is trained using at least one of (i) a plurality of images having random rotational transformations of 0°, 90°, 180°, or 270° or (ii) a plurality of flowcharts having extraneous words scattered throughout each flowchart.

15. The system of claim 9, further comprising mapping each identified text phrase to a corresponding bounding box based on a spatial location within the digitally encoded image.

16. The system of claim 9, wherein the connections are identified based on a minimum distance between sides of each bounding box relative to an arrow head or an arrow tail.

17. A non-transitory computer program product storing instructions which, when executed by at least one data processor forming part of at least one computing device, implement operations comprising:
receiving, by a machine learning component, a digitally encoded image comprising a handwritten diagram;
localizing and classifying, by the machine learning component, a plurality of objects within the handwritten diagram by defining a plurality of bounding boxes surrounding the plurality of objects based on a feature map extracted from the digitally encoded image, each bounding box surrounding one object, wherein the feature map is a compressed version of the digitally encoded image having pixels of the digitally encoded image mapped to pixels in the compressed version;
identifying, by a structure recognition component, connections between each symbol of the plurality of objects based on content of the respective object;
interpreting, by a handwriting recognition component, one or more alphanumeric text strings within a portion of the plurality of objects; and
automatically generating, without human intervention, a digital structured model of the digitally encoded image, the digital structured model having the identified connections among the plurality of objects, the digital structured model being in a computer-readable editable format.

18. The non-transitory computer program product of claim 17, wherein the localizing and the classifying comprise:
classifying each bounding box as at least one of a terminator block, a process block, an arrow block, a text block, or a decision block.

19. The non-transitory computer program product of claim 17, wherein the connections are identified based on a minimum distance between sides of each bounding box relative to an arrow head or an arrow tail.

20. The non-transitory computer program product of claim 17, wherein the machine learning component uses a convolutional neural network (CNN) architecture.

* * * * *